May 13, 1958 W. H. NEWELL ET AL 2,834,083
PARACHUTE CANOPY RELEASE
Filed May 29, 1953 2 Sheets-Sheet 1

Inventors
WILLIAM H. NEWELL
HOWARD W. BREVOORT
By Victor D. Borst
Attorney

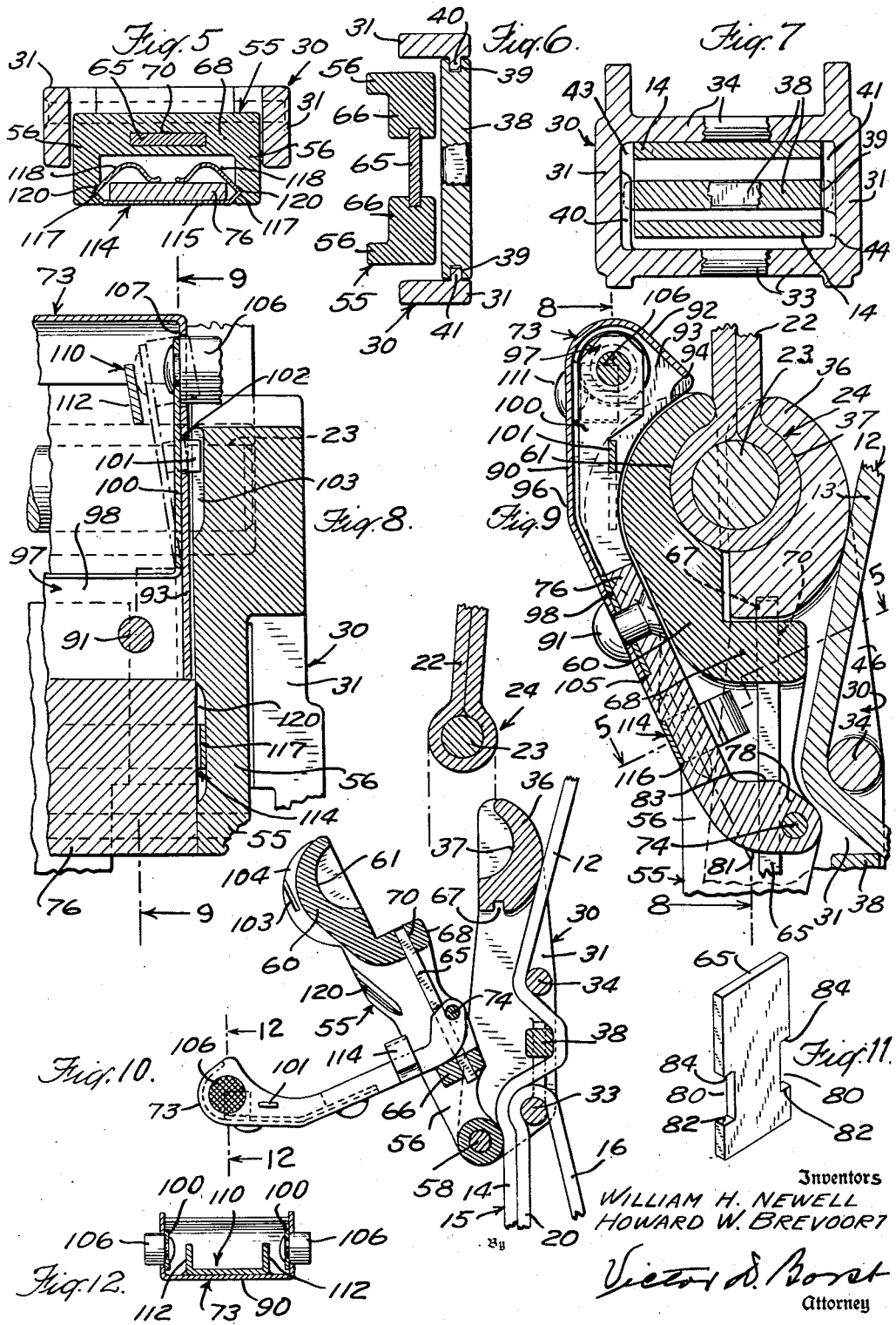

United States Patent Office 2,834,083
Patented May 13, 1958

2,834,083

PARACHUTE CANOPY RELEASE

William H. Newell, Mount Vernon, and Howard W. Brevoort, Stewart Manor, N. Y., assignors to Sperry Rand Corporation, a corporation of Delaware Application May 29, 1953, Serial No. 358,325

10 Claims. (Cl. 24—201)

The present invention relates to parachute canopy releases by which a parachutist after landing is freed from the canopy.

A conventional parachute comprises a canopy with shroud or suspension lines and two canopy webs serving as risers or lifts connected to the gathering ring or rings of said lines at one end and each carrying at its other end a lug for detachable connection to a release fastened to a strap of a harness worn by the parachutist. The release must be designed to safely and securely grasp and hold the riser lug against possible accidental escape during descent and must be capable of a quick and convenient manipulation into position to set said lug free from the harness at the instant the parachutist lands and before the inflated canopy starts to drag him over the terrain.

In one conventional type of canopy release, the lug at the end of a riser comprises an exposed heavy metal fitting in the form of a connector ring or buckle. Upon disengagement of this lug from the release, the drag of the still inflated canopy pulls the metal lug uncontrollably away from the release and very often causes the lug to strike the parachutist in the face or head with resulting injury.

Moreover, in a conventional type of canopy release, in order to open up the release to free the riser lug therefrom, it is necessary for the parachutist to hold one part of the release, effect a manipulation, shift his hand to another part of the release and effect a second manipulation. This shifting of the hand is time consuming and sometimes may be difficult for the parachutist to perform coherently under the mental stress of descent, actual combat or military training maneuvers.

One object of the present invention is to provide a new and improved parachute canopy release constructed for use in conjunction with a riser lug designed for safety in preventing injury to the parachutist from the impact of the lug upon its liberation from the release.

Another object of the invention is to provide a new and improved canopy release requiring two separate and deliberate manipulating motions of the parachutist's hand to bring into open condition, but requiring no shifting of the hand from one part of the release to the other, to carry out these motions.

A further object of the invention is to provide a parachute canopy release having new and improved means by which it can be quickly and firmly attached to and adjusted along a harness strap.

A still further object of the invention is to provide a new and improved parachute canopy release which when locked will positively and safely hold a riser lug with a force greater than that encountered even under extraordinary use, which is adapted for installation on existing types of harness, both of the seat and back type without major modifications, which has a minimum number of springs and other parts, which is efficiently operable even after being dragged through sand and/or water or otherwise fouled with no increase in opening force, which can be worn by the parachuist without discomfort, and which is rugged, durable and capable of repeated use.

In accordance with certain features of the invention, the metal part of the riser lug is web-padded to prevent it from injuring the parachutist when this lug is disengaged from the release. To that end, the riser lug comprises a canopy fabric web wrapped or looped around a metal core pin to form a handle or bar-shape lug, in which the core pin is entirely confined protectively within the boundaries of the web. The release is formed with two jaw frames connected for relative movement and having opposed jaws with channel-shaped gripping surfaces for receiving the riser lug snugly therebetween and for holding it positively against disengagement in interlocked position of the jaw frames.

As another feature of the invention, the canopy release comprises a pair of jaw frames pivotally secured together for relative movement and carrying a pair of jaws for gripping and holding therebetween a riser lug in locked position of the jaw frames and a separate latch lever for unlocking the jaw frames to set the riser lug free from the jaws. This latch lever is held in position against unlocking movement by locking devices affording double safety against accidental displacement of the latch lever. The first lock to be released before the latch lever can be actuated into jaw opening position includes positive acting detents tripped from finger pieces carried by the latch lever. These finger pieces are located in convenient position to be held between the thumb and forefinger, not only for the purpose of releasing the detent but also for swinging the latch lever about its pivotal support into jaw opening position.

The second lock to be released requires no separate manipulation and consists of a friction device resisting the initial swinging movement of the latch lever towards this jaw opening position. As a further feature, this friction device is of the automatic snap type, causing it to click into and out of operative position by the mere swinging movement of the latch lever in appropriate direction. Thus, the parachutist effects opening of the release simply and conveniently, without shifting his hand from one part of the release to another. This arrangement is not only convenient to operate but reduces the number of necessary parts to a minimum. Moreover, it permits the parachutist to carry out with safety, preliminary release manipulations before landing, so that upon impact, a quick final release manipulation can be effected.

As another feature, the release comprises a slide bolt for locking and unlocking the jaw frames, a latch lever, and a lost-motion connection between the latch lever and the slide bolt causing the latch lever to swing idly for a substantial angle from jaw locking position before initiating the jaw unlocking movement of the bolt and causing complete jaw unlocking movement of the bolt by a continued swinging movement of the latch lever through a smaller angle. The parachutist can thereby unlock his latch lever through the finger piece manipulation described and pull the latch lever partially from jaw locking position beyond its friction holding position, without unlocking the lug retaining jaws, even before he lands, and then with a sudden jerk complete the movement of the latch lever to effect quick release of the riser lug.

As another feature, the canopy release comprises two jaw frames connected together for relative movement, one of these jaw frames being adapted to be attached to a harness strap. The strap attaching means comprises a pair of parallel strap reeving bars extending across side pieces of the strap attaching jaw frame and rigid therewith, and a strap clamping bar adjustably held between two guides along these side pieces and between the strap reeving bars. This strap clamping bar can be moved between the two strap reeving bars, while maintained parallel thereto to jam and thereby clamp the clamping bar against the reeved strap zig-zagged over the bars and to permit adjustments of the strap attached jaw frame along the harness strap. Entry and exit openings in diagonally opposite ends of these guides permit the clamping bar to be entirely detached from the strap attached jaw frame or attached thereto for disassembly or assembly by a simple operation.

Various other objects, features and advantages of the invention are apparent from the following particular description and from the accompanying drawings, in which—

Fig. 5 is a transverse section of the parachute canopy release taken along the lines 5—5 of Figs. 3 and 9;

Fig. 6 is a transverse section of the parachute canopy release taken along the lines 6—6 of Fig. 3;

Fig. 7 is a longitudinal detail section of the parachute canopy release taken along the lines 7—7 of Fig. 3;

Fig. 8 is an enlarged detail sectional view of the parachute canopy release taken along the lines 8—8 of Fig. 9 and shows in full lines the release in closed lug clasping position and in dot and dash lines the initial steps in the process of unfastening the latch mechanism holding the release in closed position;

Fig. 9 is an enlarged detail sectional view of the parachute canopy release taken along the lines 9—9 of Fig. 8 and shows the release in closed lug clasping position;

Fig. 10 is a longitudinal section of the parachute canopy release but shows this release in fully open position with the riser lug set free therefrom;

Fig. 11 is a perspective of the slide latch bolt employed to hold the lug clasping jaws of the parachute canopy release in closed locked position; and Fig. 12 is a detail section of the parachute canopy release taken on lines 12—12 of Figs. 2 and 10.

Figure 1:
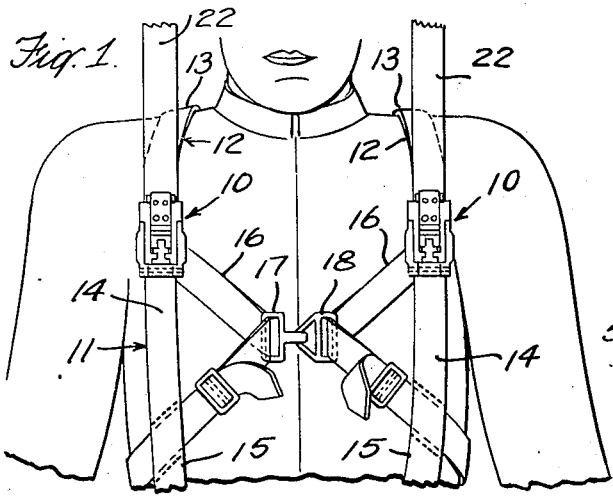
Fig. 1 is a front assembly view of a parachute canopy release embodying the present invention and shows this release attached to the harness worn by a parachutist and to the riser or lift webbing.
Figure 4:
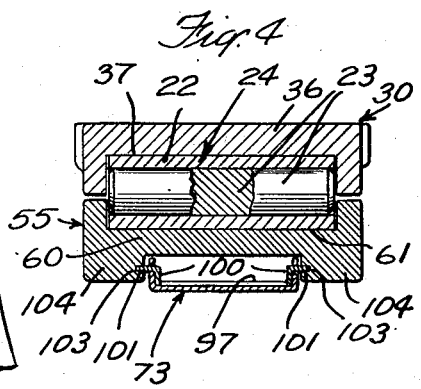
Fig. 4 is a transverse section of the parachute canopy release taken on the line 4—4 of Figs. 2 and 3.

Referring to Fig. 1 of the drawings, the parachute canopy releases 10 embodying the present invention, are shown attached to a parachute harness 11, which may be of the conventional back or seat pack type. This parachute harness 11 is shown comprising a pair of parallel webs 12, reeved through the canopy releases 10 respectively in the manner to be described and having sections 13 above these releases passing over the shoulders of the parachutist to define shoulder straps and sections 14 below these releases extending to the legs of the parachutist to form the front plies of two-ply leg straps 15. Adjustable cross-webs 16, defining breast straps coupled through readily disengageable ring hook 17 and double ring catch 18, are also reeved through the canopy releases 10 respectively and have sections 20 (Fig. 3) extending along the web sections 14 to form the rear plies of the two-ply leg straps 15.

For attaching the canopy of the parachute to the harness 11, there is provided a pair of canopy webbings 22 secured to the shroud or suspension lines of the canopy through the usual gathering rings and serving as harness lift or riser webs. As a feature of the present invention, each of these riser webs 22 is wrapped or looped around a cylindrical metal core pin 23 to form therewith a web-padded connector or coupling lug 24. This riser lug 24 is free from metal parts projecting outwardly beyond the web wrapping 22 and is adapted to be retained in the corresponding canopy release 10 in the manner to be described. The opposed facing webs of each riser just above the coupling pin 23 are preferably fastened together by stitching, to hold the webs snugly around said pin and to shape the resulting web-padded lug 24 in the general form of a handle or bar. The riser lug 24 in this shape can be securely grasped by and between the opposed jaws of the corresponding canopy release 10 when this release is closed and can be easily freed therefrom when opened.

Each of the parachute canopy releases 10 comprises a fixed jaw frame 30 which is preferably a unitary structure, such as a casting or forging and which has a pair of opposed side pieces or sections 31 formed at their lower ends with respective knuckle hinge projections 32, a pair of round web reeving cross-bars 33 and 34, extending between said side pieces in the lower part of the frame and a jaw 36 at the upper end. This jaw 36 is formed with a recess 37 substantially channel-shape and more specifically substantially semi-cylindrical, defining a concave surface into which the web-padded riser lug 24 is nested in closed locked position of the release 10.

To retain the jaw frame 30 in adjustable position on the harness straps and specifically on one of the webs 12 and one of the webs 16, there is provided for cooperation with the fixed web reeving bars 33 and 34, a movable web clamping bar 38 preferably of substantially rectangular cross-section, guidedly supported between these reeving bars substantially in the center plane thereof for movement between these reeving bars. Guide means for holding the web clamping bar 38 in this center plane of the web reeving bars 33 and 34 and for directing the adjusting or web releasing movement of this clamping bar between these reeving bars, while retaining this clamping bar against rotation about its longitudinal axis, comprises guide slots 39 formed in the ends of the clamping bar and receiving guide ribs 40 and 41 along the side frame pieces 31 with a slide fit.

To permit the web clamping bar 38 to be removed from or inserted into operative position, the guide rib 40 extends upwardly from the lower web reeving bar 33 but stops short of the upper web reeving bar 34 to form an opening 43 through which one slotted end of the web clamping bar 38 may pass and the guide rib 41 extends downwardly from the upper web reeving bar 34 but stops short of the lower web reeving bar 33 to form an opening 44 through which the other slotted end of the web clamping bar 38 may pass. The two openings 43 and 44 being diagonally arranged, the web clamping bar 38 may be removed from the jaw frame 30, by tilting said bar so as to bring the slotted ends thereof opposite the slot openings 43 and 44, and moving said bar forwardly while in this tilted position. This arrangement permits easy assembly of the clamping bar 38 and the one-piece jaw frame 30.

Adjustment of the jaw frame 30 along the web 12 is effected by pulling this web slack, moving the jaw frame to the desired position, and tightening said web to cause it to jam against the clamping bar 38.

In attaching the jaw frame 30 to the harness 11, a corresponding cross-web 16 defining one of the breast straps, is trained over the lower reeving bar 33 and downward along the lower section 14 of the corresponding web 12 to form with this web section 14, when stitched thereto, one of the leg straps 15. The upper section 13 of the web 12 is zig-zagged across the lower web reeving bar 33 in front of the cross-web 16, across the web clamping bar 38 and across the upper web reeving bar 34 and emerges from an opening 46 in the jaw frame 30 between the upper web reeving bar 34 and the jaw 36 to form one of the shoulder straps.

Pivotally connected to the lower end of the jaw frame 30, is the lower end of a mating jaw frame 55, which is preferably a unitary structure, such as a casting or forging, and which has a pair of opposed side pieces or sections 56, and a center hinge projection 57 at its lower end, flanked by the hinge projections 32 of said jaw frame 30 and secured thereto by a pintle 58 to form a knuckle hinge connection therewith. The upper end of the jaw frame 55 is formed with a jaw 60 located opposite the jaw 36 in closed position of the jaw frames 30 and 55 and is similarly formed with a channel-shape recess 61 and more specifically a substantially semi-cylindrical one, defining a concave surface into which the web-padded riser lug 24 is nested in closed position of said jaw frames. In this closed position of the jaw frames 30 and 55, the riser lug 24 is snugly embraced peripherally by the peripheral semi-cylindrical walls of the jaws 36 and 60 and is flanked at its ends by the upper ends of the side pieces 31 and 56 of the jaw frames 30 and 55 defining the end walls of said jaws. With this arrangement, the riser lug 24 is almost completely and protectively housed between the jaws 36 and 60 and firmly and securely retained therein against upward displacement or endwise displacement with respect to said jaws, when said jaws are in closed locked position.

For releasably locking the jaw frames 30 and 55 against pivotal opening movement, there is provided a latch bolt 65 in the form of a slide, carried by one of the jaw frames and movable into locking engagement with the other jaw frame. In the specific form shown, the slide 65 constitutes a plate and is slidably retained in a pair of opposite grooved guides 66 in the side pieces 56 of the jaw frame 55 for vertical movement therealong, and the underside of the jaw 36 has a catch conformation for locking engagement with said slide. This catch conformation is formed by a groove 67 in the underside of the jaw 36 adapted to receive the upper end of the slide 65 in the upper jaw locking position of said slide.

To assure the firm positive locking of the jaw frames 30 and 55 together in closed position through the expediency of the latch slide 65, the jaw 60 has a lower rearward extending lip 68 overlying the lower section of the jaw 36 and provided with a slot 70 in registry with the jaw groove 67 in closed position of the jaws, to receive said slide in jaw locking position.

For moving the slide 65 into and out of jaw locking position, there is provided a latch handle 73 in the form of a lever, pivoted at its lower end to the jaw frame 55 by means of a pivot pin 74 mounted across said jaw frame with the ends of said pin extending into the side pieces 56 of the jaw frame 55. The jaw frame 30 is wider than the jaw frame 55 and is deep enough, so that in closed position of said jaw frames, the jaw frame 55 nests into the jaw frame 30 with the side pieces 31 of said jaw frame 30 flanking the side pieces 56 of said jaw frame 55 and flanking also the ends of the pivot pin 74 supporting the latch lever 73. This arrangement guards the pivot pin 74 against possible accidental endwise removal and forms at the same time a compact release unit in closed position of said unit.

For moving the slide 65 into and out of jaw locking position by the movement of the latch lever 73 about its pivot support 74, the latch lever comprises a base plate or bar 76 (Fig. 9) with a pair of similar ear-like extensions 78 at its lower end, projecting from opposite sides of said plate into notches 80 respectively formed in the sides of the slide 65, to straddle said slide. These extensions 78 are shaped to serve as cams and for that purpose, each of said extensions is formed with a lower convexly rounded cam edge 81 adapted to ride across the lower edge 82 of the corresponding slide notch 80 for follower operation, when the latch lever 73 is rotated counterclockwise (Figs. 3 and 9) about its pivot support 74 towards jaw opening position, and an upper substantially straight cam edge 83 adapted to ride across the upper edge 84 of said slide notch for follower operation, when said latch lever is rotated clockwise (Figs. 3 and 9) about said pivot support towards jaw closing position. The ear extensions 78 in the latch lever 73 serve not only as cams to operate the latch slide 65 as described, but also as hinge leaves to receive the pivot pin 74 on the rear side of the slide 65.

The upper end of the latch lever 73 is constructed with a detent device for positively locking the latch lever 73 against jaw opening movement and a manually operable tripping device for releasing said detent device. To that end, the latch lever 73 comprises a comparatively thin plate 90 of a U-shaped cross-section receiving at its lower end the upper end of the base lever plate 76 and rigidly secured thereto by any suitable means, as for example rivets 91. This plate 90 is shaped at its upper end to form a hood 92 and a pair of side flanges 93 closing the sides of said hood. These flanges 93 have rear edges 94 conforming in curvature with the outer curvature of the jaw 60 and the front wall of the lever plate 90 has a transverse offsetting bend 96 to permit the latch lever 73 in jaw closing position, to nestle close to said jaw, as shown in Fig. 9. Secured to the front wall of the plate 90 is a lever locking spring device 97 comprising a lower bracket part 98 of U-shaped cross-section, receiving the upper end of the base lever plate 76 and rigidly secured thereto by the rivets 91 and a pair of upwardly extending spring arms 100 with offset extensions 101 urged by the inherent resiliency of said spring arms into position to pass through slots 102 (Fig. 8) in the side flanges 93 respectively of the hood forming lever plate 90 and into grooves 103 of the jaw frame 55 and to serve thereby as detents for locking the latch lever 73 in jaw closing position. The jaw frame 55 is formed at its upper end with side forward wing extensions 104 to receive therebetween the upper end of the latch lever 73 and to present therein the locking grooves 103 for the spring detents 101.

The base plate 76 of the latch lever 73 is preferably formed with a recess 105 at its upper end, deep enough to receive the lower end of the plate 90 and the lower bracket part 98 of the spring device 97 and to make the outer surfaces of said plate 90 flush with the outer surfaces of the base plate 76 at the juncture between said base plate 76 and said plate 90.

To set the latch lever 73 free from the locking action of the spring detents 101 for jaw opening movement, the upper ends of the spring arms 100 carry finger pieces 106, shown in the form of cylindrical push buttons riveted to said spring arms and projecting through holes 107 in the side flanges 93 respectively of the hood forming lever plate 90, to render said finger pieces conveniently accessible for manipulation from the outside of said plate 90. The outer ends of these finger pieces 106 have their surfaces preferably knurled or otherwise roughened to assure firm finger grip thereon. When these finger pieces 106 are pressed towards each other, the spring arms 100 carrying these finger pieces are flexed inwardly towards each other, causing the detents 101 on said spring arms to move out of the locking grooves 103 in the jaw frame 55, thereby freeing the latch lever 73 for jaw opening manipulation.

To limit the extent of flexing of the spring arms 100 into lever unlocking position, there is provided a stop device 110 comprising a U-shaped piece rigidly secured to the front wall of the lever plate 90, as for example, by rivets 111 and having side flanges 112 inclined to conform with the inclination of the spring arms 100 in extreme flexed lever unlocking position. These side flanges 112 are in the path of the finger pieces 106 and serve as abutments to stop the inward flexing of the spring arms 100 beyond a limiting position and to protect thereby said spring arms against permanent strain.

After the latch lever 73 has been unlocked by pressing action on the finger pieces 106, it is necessary to swing said latch lever counterclockwise (Figs. 3 and 9) about its pivot support 74 in order to cam the jaw locking slide 65 downward out of jaw locking position. The initial phases of this counterclockwise lever movement is yieldably resisted by a spring device comprising a resilient leaf 114 having a flat intermediate section 115 (Fig. 5) fitting snugly in a recess 116 in the front face of the latch lever base plate or bar 76, sections 117 adjoining said intermediate section and offset diagonally outward with respect to said intermediate section and then diagonally inward to form double-bevelled sides on said spring device and end sections 118 arched over said latch lever base plate and resiliently pressing against the rear face of the latter plate. The side pieces 56 of the jaw frame 55 having V-notches 120 in the inner confronting faces thereof to receive with snap engagement the double-bevelled sides 117 of the spring device 114. These bevelled sides 117 of the spring device 114 extending into the V-notches 120 of the jaw frame 55 in locked position of the latch lever 73, resist the counterclockwise (Figs. 3 and 9) movement of said latch lever at the beginning of this movement but yield automatically during this initial movement to cause said spring sides 117 to snap out of said V-notches 120. These bevelled sides 117 of the spring device 114 automatically snap back into the V-notches of the jaw frame 55, when the latch lever 73 is moved clockwise (Fig. 10) into jaw locking position.

After the latch lever 73 has been freed from the restraining influence of the spring device 114 during the initial jaw opening movements of said latch lever counterclockwise (Figs. 3 and 9), in the manner described, this movement of the latch lever may be continued without resistance. The cams 78 are designed as a lost-motion connection between the latch lever 73 and the jaw locking slide 65, to impart to this slide no releasing movement during a part of this counterclockwise rotation of the latch lever 73. In the specific form shown, this idle movement of the latch lever 73 from jaw locking position amounts to about 45°. At the end of this idle movement, the cam edges 81 on the cams 78 riding across the lower edges of the slide notches 80, start to move the slide 65 downwardly and this action is continued for a predetermined angle of counterclockwise rotation of the latch lever 73, which in the specific form shown amounts to about 15°. It is seen, that after the latch lever 73 has rotated counterclockwise a total of about 60° from its jaw closing position, the slide 65 will have been completely withdrawn from locking engagement with the jaw 36. At the completion of this slide withdrawing operation, the latch lever 73 will rest on the slide guides 66. Any further counterclockwise rotation of the latch lever 73 will cause the jaw frame 55 to pivot away from the jaw frame 30 about the hinge axis of the pintle 58 and the jaws 36 and 60 to separate sufficiently to release the riser lug 24. Because of the rounded shape of the riser lug 24 and of the jaw recesses 37 and 61, the pull of the inflated parachute canopy on said lug will cause said lug to have a camming action on the jaws 36 and 60 and to assist thereby in the opening of said jaws in the last stages of latch lever manipulation.

Figure 2:
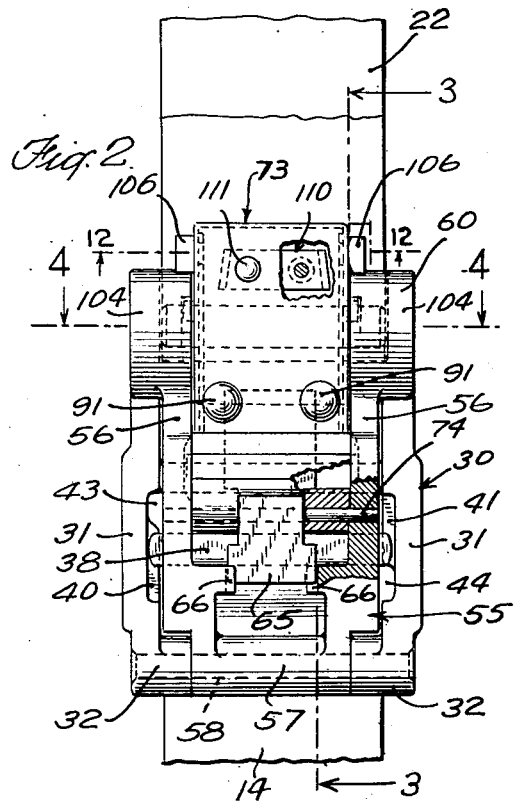
Fig. 2 is a front view of the parachute canopy release illustrated in closed lug clasping position, parts of the release being shown broken away to expose some of the interior structure of the release.

Although the operation of the parachute canopy release of the present invention has been made obvious from the foregoing description, it is herein summarized briefly:

While the parachutist is descending, the web-padded riser lug 24 is retained securely between the jaws 36 and 60, as shown in Figs. 2 and 9. This riser lug 24 is almost completely housed not only peripherally but at the ends by the walls of the jaws 36 and 60. Under these conditions, the slide 65 is extending upwardly through the slot 70 in the lip 68 of the jaw 60 and into the groove 67 of the jaw 36, so that the two jaws are positively locked against separation. The slide 65 in turn is locked against downward jaw releasing movement by the cams 78 carried by the latch lever 73 and immobilized by the locking of said latch lever in the upward position shown in Figs. 2 and 9. The latch lever 73 is locked first by the positive action of the spring detents 101 carried by said latch lever 73 and projecting into the grooves 103 of the jaw frame 55, and second by the frictional action of the spring device 114 also carried by said latch lever and projecting into the V-notches 120 of the jaw frame 55. During this stage of the operation, the parachute canopy release is compact with no projecting parts which may be accidentally operated to cause premature release of the riser lug 24. Structural parts, such as the pivot pin 74 or the lug core pin 23, which might accidentally fall out of place are protectively housed.

Just before the parachutist lands, he presses the two finger pieces 106 on each canopy release 10 simultaneously with the thumb and forefinger of each hand, causing the spring arms 100 to flex inwardly and the detents 101 carried thereon to be moved out of the grooves 103 of the jaw frame 55, until the finger pieces reach the stop flanges 112, as shown in dot and dash lines in Fig. 8. In this position, the latch lever 73 is released for counterclockwise rotation about its pivot support.

The preliminary operations described are easy and convenient for the parachutist to perform, even if he is under emotional strain, and even if his hands are heavily gloved.

Figure 3:
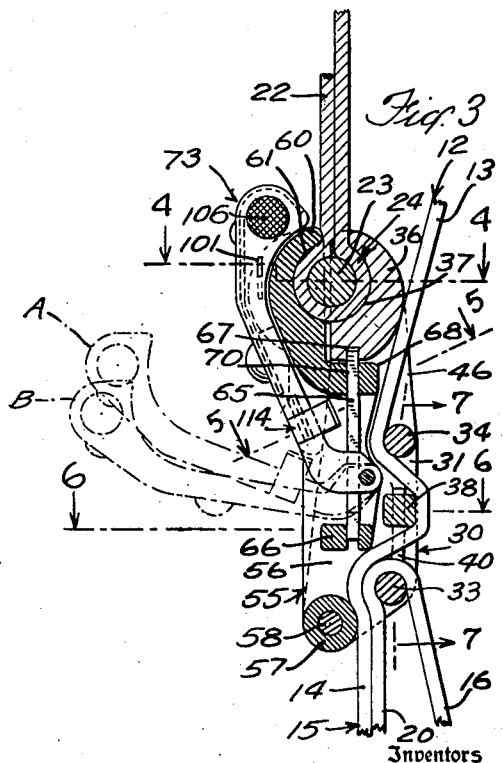
Fig. 3 is a longitudinal section of the parachute canopy release taken along the lines 3—3 of Fig. 2 and shows in full lines the release in closed lug clasping position and in dot and dash lines, successive positions of the manually operable latch lever in the process of opening the release, to disengage the harness from the canopy of the parachute.

At the instant of impact or even a short interval sooner, the parachutist, after having unlocked the latch levers 73 on the two releases 10 in the manner described, and without in any way changing the position of his hands on the finger pieces 106, pulls these unlocked levers forwardly or counterclockwise (Figs. 3 and 9). Initially, this forward counterclockwise movement of each latch lever 73 is yieldably resisted by the spring device 114 frictionally acting in the V-notches 120 of the jaw frame 55, but once this spring device has been snapped out of these notches, the latch lever 73 can be rotated forwardly with no resistance but with no jaw unlocking effect, until the latch lever reaches a certain position in its forward movement, indicated by the position A in dot and dash lines in Fig. 3. In the specific form of the invention, this position of the latch lever 73 is about 45° from its initial jaw locking position. The parachutist can time his release manipulations, so that at the very instant of impact, the latch lever 73 will have reached this position.

With continued movement of the latch lever 73 forwardly or counterclockwise beyond position A (Fig. 3), the slide 65 will be withdrawn by the cams 78 on the latch lever out of cam locking position, until the latch lever reaches a position in which the slide will be completely withdrawn from the groove 67 in the jaw 36. The movement of the latch lever 73 from position A (Fig. 3) to the jaw unlocking position shown in dot and dash lines as position B in Fig. 3, is preferably through a comparatively small angle, which in the specific form of the invention, is about 15°, to permit the parachutist to effect the last stages of the jaw unlocking operation in an instant, before the pull of the canopy starts dragging him over the terrain.

The withdrawal of the slide 65 in the manner described, unlocks the jaws 36 and 60 and causes these jaws to open, either by the pull of the riser lug 24 or by the continued movement of the latch lever 73, causing the jaw frame 55 to swing away from the jaw frame 30, about the pivot mounting 58. The movement of the jaw frame 55 away from the jaw frame 30 will cause the riser lug 24 to pull out from the open jaws 36 and 60 and since this lug is protectively padded with the canopy webbing, it will not injure the parachutist. By the operations described, the parachutist will be disengaged from the canopy and can divest himself easily thereafter from the harness or carry out any other maneuvers required.

While the invention has been described with particular reference to a specific embodment, it is to be understood that it is not to be limited thereto but is to be construed broadly and restricted solely by the scope of the appended claims.

What is claimed is:

1. A parachute canopy release for the harness of a parachutist comprising a pair of jaw frames secured together for relative movement and carrying a pair of opposed jaws with substantially semi-cylindrical recesses respectively for embracing and holding therebetween a web-covered riser lug, a movable latch bolt for locking said jaw frames into closed lug holding position, a latch handle separate from said jaws supported for movement away from and towards jaw locking position, said latch handle in jaw locking position extending close to one of said jaws, manually releasable means for locking said latch handle in said position, and a lost-motion connection between said latch handle and said latch bolt causing said latch handle to move idly from said latter position through a substantial distance into an operative position and to actuate said latch bolt into jaw unlocking position as said latch handle continues its movement beyond said operative position through a substantially smaller distance, and means for securing said release to the harness of a parachutist with its jaws at the upper end of the release, said jaws when open defining an opening therebetween at the top through which the riser lug may escape upwardly.

2. A parachute canopy release comprising a pair of jaw frames secured together for relative movement and carrying a pair of opposed jaws with channel-shaped recesses for holding therebetween and therealong a riser lug one of said jaw frames having side pieces between which the corresponding jaw extends, a movable latch bolt for locking said jaw frames into a closed position, a latch handle separate from said jaws and supported for movement away and towards jaw locking position, said latch handle in jaw locking position nesting between said side frame pieces close to the jaw extending therebetween a spring detent device carried by said latch handle and engaging said side frame pieces in jaw locking position of said latch handle for locking said latch handle in said jaw locking position, a pair of buttons carried by said latch handle and adapted to be pressed between the thumb and forefinger of a hand to actuate said spring detent device into handle releasing position, said buttons also serving as finger pieces by which said latch handle may be moved away from jaw locking position, frictional restraining means acting between said latch handle and said side frame pieces and operable to yieldably resist initial movement of said latch handle away from said jaw locking position, said frictional restraining means being rendered automatically inoperative when said latch handle has reached a predetermined position away from the locked jaw frames, means responsive to the movement of said latch handle beyond said predetermined position for moving said latch bolt into such a position as to permit opening said jaw frames so as to free the riser lug from between said jaws, and means for securing said release to the harness of a parachutist with its jaws at the upper end of the release, said jaws when open defining an opening therebetween at the top through which the riser lug may escape upwardly.

3. A parachute canopy release comprising a pair of jaw frames pivotally secured together near one end for relative movement and carrying a pair of opposed jaws near the other end with respective walls defining a pair of opposed channel-shaped recesses respectively for grasping therebetween a bar-like riser lug, the wall of the jaw of one of said jaw frames having a groove formed therein extending into the outer surface thereof, the wall of the other jaw having a lip extension overlying the grooved jaw wall, said lip extension having a slot formed therethrough in registry with said groove, a slide carried by one of said jaw frames for slidable guided movement therein and movable into said registering slot and groove to lock said jaws in a closed lug grasping position against separation and movable out of said groove to permit said jaws to open and thereby to release said lug, manually operable control means for moving said slide into and out of jaw locking position, and means for securing said release to the harness of a parachutist with its jaws at the upper end of the release, said groove and said lip being on the underside of the jaws in harness secured position of the release, and said jaws when open defining an opening therebetween at the top through which the riser lug may escape upwardly.

4. A parachute canopy release comprising a pair of jaw members including front and rear jaw frames adapted to be supported on a harness strap with the rear jaw frame attached directly to and extending along said strap and the other front jaw frame extending along said rear jaw frame in closed position of the release, said jaw frames being pivotally secured together near their lower ends for relative angular movement and carrying a pair of opposed jaws near their upper ends having respective walls and defining a pair of channel-shaped recesses respectively for grasping therebetween a riser lug, the end walls of the jaw of the front jaw frame having forward wing extensions with respective confronting grooves, means for locking said jaw frames together against relative pivotal movement in closed lug grasping position and comprising a latch slide supported on one of said jaw frames and slidable into positive locking engagement with the other jaw frame, a latch lever having a pivotal connection near one end to said front jaw frame and extending along and close to said front jaw frame when said slide is in jaw locking position, the upper end of said latch lever being designed to nest into the space between said wing extensions in jaw closed position of said latch lever, manually releasable spring detents carried by said latch lever and adapted to be spring-pressed into said grooves respectively in the jaw closed position of said latch lever to lock said latch lever in said position, and means responsive to the angular movement of said latch lever away from said front jaw frame for moving said slide out of jaw locking position and responsive to the angular movement of said latch lever towards said front jaw frame for moving said slide into jaw locking position.

5. A parachute canopy release comprising a pair of jaw members including front and rear jaw frames adapted to be supported on a harness strap with a rear jaw frame attached directly to and extending along said strap and the other front jaw frame extending along said rear jaw frame in closed position of the release, said jaw frames being pivotally secured together near their lower ends for relative angular movement and carrying a pair of opposed jaws near the upper ends for grasping therebetween a riser lug, the front jaw frame having a pair of side frame pieces provided with a pair of slide guides respectively, a latch slide having its sides slidably mounted in said guides respectively for directing the movement of said slide towards and away from the jaw of the rear jaw frame and having notches on its sides respectively, a catch on said rear jaw frame engaged by said slide when said slide is moved towards the jaw of the rear jaw frame, a latch lever pivotally secured to the front jaw frame and having a pair of side ears located near its pivot support and extending into said slide notches respectively, said ears having cam conformations to move said slide into engagement with said catch and thereby to lock said jaws into lug holding position when said latch lever is moved angularly towards said front jaw frame in a position close thereto and therealong and to move said slide out of engagement with said catch and thereby to unlock said jaws for lug releasing operations, when said latch lever is moved angularly away from said front jaw frame.

6. A parachute canopy release comprising a pair of jaw frames pivotally secured together and carrying opposed jaws to grasp therebetween a riser lug, a catch on one of said jaw frames, a latch bolt supported on the other of said jaw frames for movement into and out of jaw locking engagement with said catch, a latch lever pivotally secured to one of said jaw frames, a connection between said latch lever and said bolt for moving said bolt into and out of locking engagement with said catch in response to the angular movement of said latch lever, manually releasable detent means for positively locking said latch lever in jaw locking position, and frictional spring means carried by said latch lever and designed for snap engagement with and disengagement from one of said jaw frames, when said latch lever is in jaw locking position, and adapted yieldably to resist jaw unlocking movement of said latch lever during the initial phase of the latter movement, the connection between said latch lever and said bolt being a lost-motion connection, delaying the beginning of the releasing movement of the bolt from locking engagement with said catch until after said spring means has been snapped out of engagement with the latter jaw frame.

7. A parachute canopy release as described in claim 6, wherein said frictional spring means comprises a leaf spring bent around said latch lever to define doubly-bevelled sides and end sections arched over said latch lever into resilient engagement with said latch lever, and wherein one of said jaw frames has a pair of side pieces between which said latch lever is adapted to extend in jaw locking position of said latch lever and confronting V-notches in said side pieces respectively to receive said doubly-bevelled spring sides respectively with snap engagement.

8. A parachute canopy release for the harness of a parachutist comprising a pair of jaw frames pivotally secured together and carrying a pair of opposed jaws with respective channel-shaped recesses for holding therebetween and therealong a riser lug having a riser webbing wrapped therearound, a slide for locking said jaws together, means guiding said slide for movement along a straight line into position to lock said jaws together and out of said position to unlock said jaws, a latch lever separate from said jaw frames and from said slide and pivotally supported at one end on one of said frames, said latch lever being manipulable about its pivot support and in one position extending along the frame to which said lever is pivotally connected, said latch lever having its other end free and manipulable and located close to the jaw of the latter jaw frame, said slide in said one position of said lever being in said jaw locking position, means responsive to the pivotal movement of said latch lever in one direction towards said one position for automatically moving said slide into said jaw locking position and responsive to the pivotal movement of said latch lever in the opposite direction from said one position for automatically moving said slide into jaw unlocking position, and means for securing said release to the harness of a parachutist with its jaws at the upper end of the release, said jaws when open defining an opening therebetween at the top through which the riser lug may escape upwardly.

9. A parachute canopy release for the harness of a parachutist comprising a pair of jaw frames pivotally secured together near their lower ends and carrying a pair of opposed jaws near their upper ends for holding a riser lug therebetween, each of said jaw frames comprising a pair of side pieces extending between the ends of the jaw frame, one of said jaw frames being wider than the other jaw frame and being deep enough so that, in closed lug holding position of said jaws, the narrower jaw frame nests into the other jaw frame with the side pieces of the latter jaw frame flanking the narrower jaw frame, a latch lever separate from said jaw frames and in closed position of said jaws extending along one of said jaw frames in upright position, with its lower end extending between the side pieces of the latter jaw frame and pivoted to one of said jaw frames and with its upper end nested close to one of the jaws, the pivot support for said latch lever comprising a pivot pin passing through the lower end of said latch lever and the side pieces of the narrower jaw frame and flanked at the ends by the side pieces of the wider jaw frame the upper end of said latch lever having a handle conformation by which said latch lever may be manipulated from said upright position to a position away from said jaw frames, and means responsive to the pivotal movement of said latch lever into said upright position for locking said jaw frames against pivotal movement with said jaws in closed lug holding position and responsive to the pivotal movement of said latch lever away from said upright position and away from said jaw frames for releasing said jaw frames for pivotal movement to permit said jaws to open.

10. In combination, a canopy riser lug for a parachute comprising a cylindrical metal core pin of elongated shape, and a canopy riser webbing wrapped around said core pin to form therewith said lug, in the general form of a cylindrical handle or bar, said pin being entirely enclosed within the wrapping of said webbing, whereby said lug is free of metal parts or fittings projecting outwardly beyond said webbing, and a parachute canopy release for use in connection with the harness of a parachutist, comprising a pair of opposed jaws with substantially semi-cylindrical recesses and end walls to embrace and completely house said web-padded lug for coupling, means for supporting said jaws for relative movements towards and away from each other into closed and open position, means for locking said jaws in closed lug holding position, latch means for unlocking said jaws to permit said jaws to open up and the riser lug to be released, and means for securing the release to the harness of a parachutist with its jaws at the upper end of the release, said jaws when open defining an opening therebetween at the top through which the riser lug may escape upwardly.

References Cited in the file of this patent

UNITED STATES PATENTS

| | | |
|---|---|---|
| D. 152,478 | Hutchinson et al. | Jan. 25, 1949 |
| 1,782,134 | Coplen | Nov. 18, 1930 |
| 2,088,820 | Tompkins | Aug. 3, 1937 |
| 2,133,066 | White | Oct. 11, 1938 |
| 2,245,270 | Goode | June 10, 1941 |
| 2,372,557 | Dowd | Mar. 27, 1945 |
| 2,473,554 | Warner | June 21, 1949 |
| 2,516,004 | Kajdan | July 18, 1950 |
| 2,574,502 | Siple | Nov. 13, 1951 |
| 2,654,135 | Grizzard | Oct. 6, 1953 |

FOREIGN PATENTS

| | | |
|---|---|---|
| 15,686 | Great Britain | July 23, 1908 |
| 19,979 | Germany | Nov. 21, 1882 |
| 58,530 | Austria | Apr. 10, 1913 |
| 492,691 | Great Britain | Sept. 26, 1938 |
| 931,168 | France | Feb. 16, 1948 |